United States Patent
Chasteen et al.

(10) Patent No.: US 7,107,928 B2
(45) Date of Patent: Sep. 19, 2006

(54) SELECTIVELY DEFORMABLE CONTAINER END CLOSURE

(75) Inventors: Howard C. Chasteen, Golden, CO (US); Mike Richardson, Superior, CO (US); Terre Reingardt, Broomfield, CO (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 10/844,954

(22) Filed: May 12, 2004

(65) Prior Publication Data

US 2004/0241789 A1 Dec. 2, 2004

Related U.S. Application Data

(60) Provisional application No. 60/469,977, filed on May 12, 2003.

(51) Int. Cl.
*G01L 7/08* (2006.01)
*G01N 7/14* (2006.01)

(52) U.S. Cl. ............ 116/270; 206/459.1; 220/DIG. 16

(58) Field of Classification Search ................ 116/270, 116/201, 212, 266, DIG. 1; 220/DIG. 16, 220/610, 611, 615, 620; 206/459.1; 215/230; 53/507, 508
See application file for complete search history.

(56) References Cited

U.S. PATENT DOCUMENTS

| | | | |
|---|---|---|---|
| 1,570,732 A | 1/1926 | Emerson | |
| 2,027,430 A * | 1/1936 | Hansen ........................ | 220/624 |
| 2,296,848 A | 11/1942 | Gueffroy | |
| 2,307,043 A | 1/1943 | Hothersall et al. | |
| 3,067,015 A | 12/1962 | Lawdermilt | |
| 3,094,239 A | 6/1963 | Baker | |
| 3,736,899 A | 6/1973 | Manske ........................ | 116/270 |
| 3,771,351 A | 11/1973 | Sacks et al. | |
| 3,923,179 A | 12/1975 | Choski et al. | |
| 3,930,592 A * | 1/1976 | DiIanni ........................ | 220/270 |
| 3,960,002 A | 6/1976 | Choksi et al. .................. | 73/52 |
| 4,003,709 A | 1/1977 | Eaton et al. ................... | 422/86 |
| 4,088,086 A | 5/1978 | Miller et al. | |
| 4,426,013 A | 1/1984 | Cherchian et al. | |
| 4,458,469 A | 7/1984 | Dunn | |
| 4,591,062 A * | 5/1986 | Sandhaus ..................... | 215/230 |
| 4,642,968 A | 2/1987 | McHenry | |
| 4,667,454 A | 5/1987 | McHenry et al. | |
| 4,678,082 A | 7/1987 | Fillmore .................. | 206/459.1 |
| 4,696,580 A | 9/1987 | Kameda | |
| 4,880,129 A | 11/1989 | McHenry et al. | |
| 4,952,498 A | 8/1990 | Waters ......................... | 435/34 |
| 4,998,638 A | 3/1991 | Kawamata | |
| 5,240,131 A | 8/1993 | Keller ......................... | 215/230 |
| 5,727,710 A | 3/1998 | Severus et al. | |
| 5,804,237 A | 9/1998 | Diamond et al. ........... | 426/131 |
| 5,833,087 A | 11/1998 | Pfeiffer | |

* cited by examiner

OTHER PUBLICATIONS

Written Opinion of the International Searching Authority, dated Jan. 27, 2005, 7 pages.

*Primary Examiner*—R. Alexander Smith
(74) *Attorney, Agent, or Firm*—Sheridan Ross P.C.

(57) ABSTRACT

The present invention describes a container end closure which utilizes a material that is adapted to provide a visible indicator when the internal pressure of the contents increase to a predetermined level. In one embodiment, an interruption in a reinforcing bead incorporated in the end closure is deformed to visually notify a consumer of spoilage due to bacterial activity and to substantially prohibit the use of traditional can openers to access the spoiled contents within the container.

16 Claims, 8 Drawing Sheets

*(Rotated 90° CCW)*

SELECTIVELY DEFORMABLE CONTAINER END CLOSURE

This application claims priority to Provisional Patent Application Ser. No. 60/469,977, filed May 12, 2003, and is incorporated herein in its entirety by reference.

FIELD OF THE INVENTION

The present invention relates to containers for storing food or beverages for human or animal consumption, and more specifically for an apparatus that deforms in a predetermined manner to identify spoilage and bacterial activity.

BACKGROUND OF THE INVENTION

Containers have been used for decades to provide a safe, convenient and cost effective means for storing food products and beverages (hereinafter "food"). Generally, the consumable food is processed, placed in a container, and vacuum packed. In addition, some foods are post processed by heating or retorting to a predetermined temperature to further insure pathogen elimination. Since it is difficult to visually ascertain the state of contents inside opaque containers, it is desirable to provide a storage container which employs a means to indicate to the consumer that the internal pressure of the container has lost its vacuum, thereby indicating possible spoilage, tampering, or that the airtight seal has been compromised.

However, some canning techniques and processes require post-heating to destroy bacteria, which results in the presence of a positive internal pressure within the container. Thus, there is a significant need for an indication device that warns the public of spoilage when the container is not vacuum-sealed. Another drawback to traditional indication devices is that they are often very subtle, wherein it may be totally overlooked by the consumer. Further, some consumers may choose to take the risk that the warranty indicator is incorrect or that the contents are still acceptable, thus creating a significant health risk. Thus, there is a need for a substantially failsafe indicator device that substantially prevents a user from opening the container.

Anaerobic (bacterium that do not need oxygen to survive), and aerobic, (those bacterium that require oxygen for survival), occur frequently in nature. Both types produce byproducts as the result of their normal respiratory cycle such as water and carbon dioxide. Fortunately, most forms of bacteria are innocuous or even helpfull to mankind. However, some are harmful to man and may cause gastrointestinal discomfort or death in the young, elderly, and infirm. For example, a substantial percentage of the cases of clostridium botulism, a potentially harmful toxin generated by the activities of some bacteria, can be directly linked to the improper canning of food.

Thus there is a long-felt and unresolved need in the field of food preparation and storage to provide a container that is employed with a means to quickly and reliably identify food spoilage, and which substantially inhibits a consumer from gaining access to the contaminated contents therein by use of a conventional can opener. Furthermore, there is a significant need for a deformable indicator device which is used with pressurized containers and which selectively deform when a predetermined increase in pressure occurs.

SUMMARY OF THE INVENTION

It is thus one aspect of the present invention to provide a container, such as a metallic can, that is capable of holding a predetermined internal pressure or vacuum. Generally, containers are constructed by interconnecting a container body and a container end closure. The container body is generally a cup of two piece or drawn & ironed), or three piece (welded) construction with a formed bottom end which resists internal pressure forces that would buckle, and will subsequently deform under excessive pressure. Alternatively, one piece container bodies or cups may be used in conjunction with an end closure of the present invention. The container end closure is generally a formed, circular shaped piece of material which is interconnected to the upper end of the container body by a crimping, i.e., double seaming, welding, bonding, heat sealed, or gluing operation. Generally, the can end closures employ a countersink or other geometric configurations to strengthen the material by altering its moment of inertia, thereby increasing its bending stiffness and buckle resistance. Although generally comprised of metallic materials, it is foreseeable that plastics or other materials may be utilized.

Thus, it is a further aspect of the present invention to provide a selectively deformable end closure and container which is adapted to be accessed by various opening means. More specifically, the food products contained by the present invention are generally accessible by using can openers that employ shearing means that selectively interconnect with the container, wherein mechanically-induced rotation of the shearing means facilitates removal of the center panel of the end closure. Alternatively, containers embodied by the present invention may be opened by a piercing type can opener that selectively interconnects with a lip on the container and that are tilted inward to pierce an area in the center panel of the end closure. Alternatively, the present invention may be utilized on easy opening ends with a type of pull tab and numerous types of end closures well known in the end closure manufacturing business.

It is another aspect of the present invention to provide a container end enclosure which includes at least one area which is adapted to selectively deform when the internal pressure inside the container reaches a predetermined level. As described above, the byproduct of many types of bacteria is a gas such as carbon dioxide. When the gas builds up in a closed container, the internal pressure naturally increases, thus indicating the presence of an unacceptable amount of bacterial activity. Often spoilage of foods is not apparent until the food is ingested or an unpleasant odor is detected. Moreover, even if the effects of bacterial or fungal spoilage could be detected by the naked eye, most of the containers described herein are substantially opaque, wherein an unwary user would not identify the spoilage until exposed to noxious odors or contamination upon opening.

Preferably, the deformable section is an area on the end closure which does not employ a reinforcing bead. Thus, in one embodiment of the present invention an end closure is provided having an annular bead of less than 360 degrees, whereby an area of the parent material is left un-formed and thus structurally compromised. By employing additional beads onto the can end closure, the uniformed area may be designed to be the weakest portion of the can end closure, whereby an increase in internal pressure of the can will cause localized bucking in that specific area only. Alternatively, a plurality of unformed areas may be employed which interrupt an otherwise 360 degree annular bead to produce a can end closure which will deform in a plurality of locations.

Furthermore, one skilled in the art will appreciate that the same localized buckling effect can be achieved by altering the parent material thickness in the desired buckling area. However, this method may require additional thinning steps, i.e., coining, and the use of a thicker stock material, both of which may add additional costs.

It is another aspect of the present invention to provide a can end closure which is adapted to indicate the presence of an internal pressure increase when the contents therein are packaged under pressure. As stated above, many containers are vacuum-sealed, wherein any positive pressure increase would notify the consumer of potential spoilage due to the activity of bacteria, prior opening, or tampering. These indicators are often diaphragms that are deformed inwardly due to the vacuum in the container. Once the internal pressure is equalized or increased relative to the ambient pressure, the diaphragm protrudes outwardly, thus indicating an altered internal pressure condition. However, these types of indicators are ineffective if the contents are packaged under pressure. Thus, in one embodiment of the present invention, an end closure is provided which is rigid enough to resist the internal pressure in the container, and then adapted to deform when the internal pressure increases to a level that indicates spoilage. For example, many food items must be exposed to high pressures and temperatures during processing in order to ensure proper containment and food quality. Once the food product has been properly sealed in the container, the container will retain a positive pressure unlike the vacuum retained in other commonly known food containers. By knowing the ultimate internal pressure of the container after packaging, the deformable area can be fashioned to deform in a narrow range if the internal pressure increases to a predetermined amount, thus providing an indication of spoilage therein.

It is yet another aspect of the present invention to provide a can end closure that, when deformed, severely impedes the use of a can opener to gain access to the contents therein. Unfortunately, spoilage in a container may be undetected by a consumer, or a centrally located indication means may be overlooked or ignored by the consumer. Thus, one embodiment of the present invention is adapted to deform in such a way to substantially prohibit the use of a can opener, such as the commonly used shearing opener. More specifically, upon a predetermined pressure increase, a portion of the container end closure is designed to deform in a predetermined direction and preferably toward the end closure lip, thereby substantially preventing the shearing blade from effectively penetrating the material in that location. In another embodiment of the present invention, a plurality of deformable sections are employed such that opening a spoiled container will be more difficult.

It is another aspect of the present invention to provide a container end closure which is generally constructed from materials well known in the art, and which can be produced with well known manufacturing techniques. Thus, the concepts which are the foundation of the present invention can easily be employed on existing assembly lines without a significant increase in machinery, assembly lines or training, and thus not adding considerable cost to implement the improvements described herein. Moreover, the manufacturing techniques may be used with a variety of ductile materials such as aluminum, tinplate, steel, or other metal or non-metallic materials that have material properties that allow deformation without ultimate failure when exposed to relatively low pressures.

It is yet another aspect of the present invention to provide a deformable container end which is adapted for use with traditional cans and jars. A substantial number of people are stricken ill by not properly canning foods in their homes, or for attempting to store perishable foods well beyond any reasonable period of storage. Thus, screw-able jar ends which embody the present invention may help to alleviate the ingestion of foods that have become spoiled. Thus it is one aspect of the present invention to provide a deformable container end closure that indicates the presence of spoilage of the contents therein, and that substantially prevents opening thereof, comprising:

a circular end wall;

a central panel integrally interconnected to said circular end wall; and at least one indicator means positioned in said central panel, said indicator means having a pressure resistance less than said central panel, wherein when a pressure in the container increases to a predetermined level, said at least one indicator means employs a geometric shape which is distinct from said central panel.

DETAILED DESCRIPTION

Figure 1:
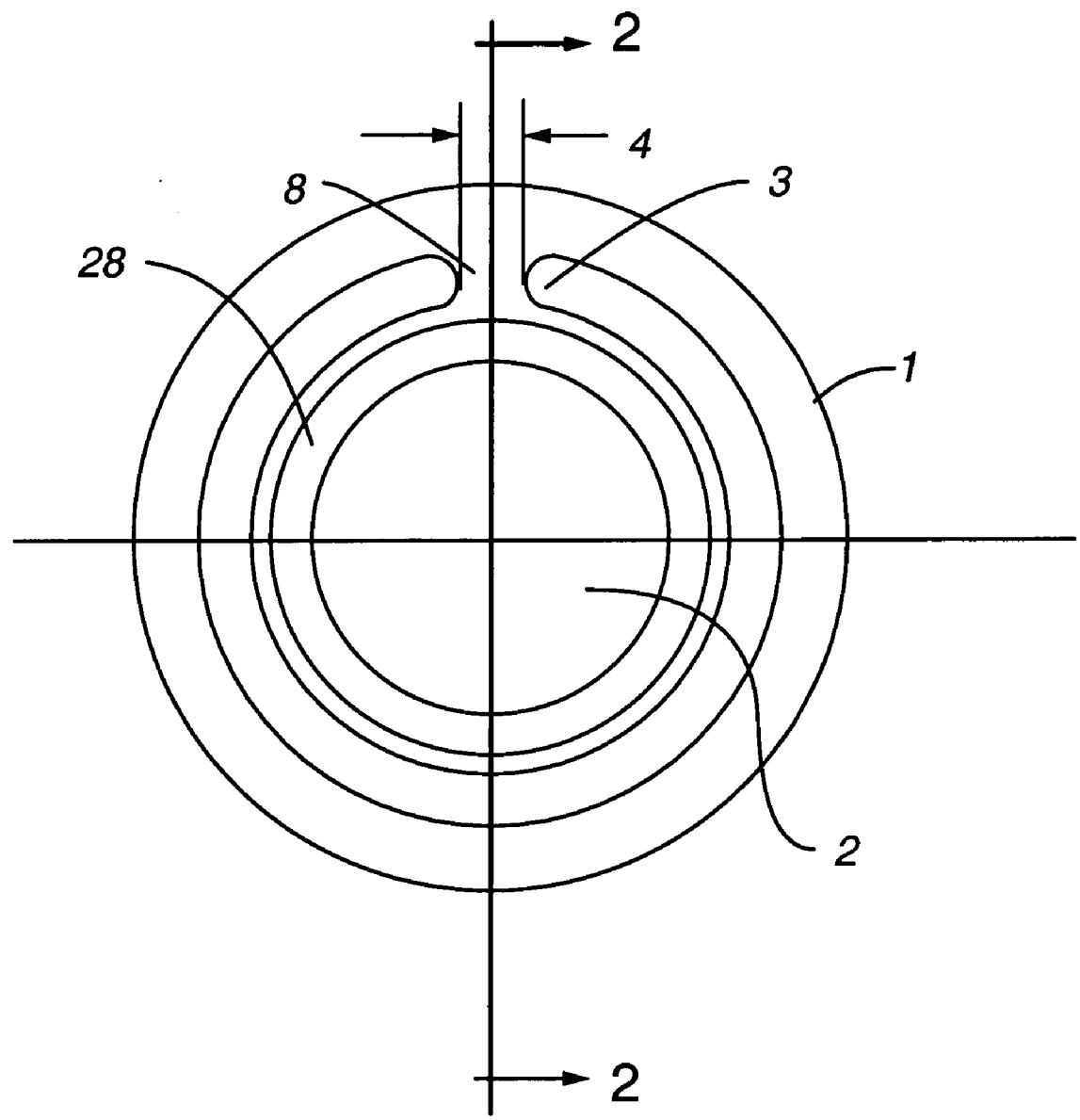
FIG. 1 is a top plan view of a container end closure, and depicting at least one deformation area per one embodiment of the present invention.

Referring now to FIGS. 1–12, a container end closure 1 is provided that is adapted to deform at a predetermined location 8 when the internal pressure reaches a predetermined level. More specifically, a container end closure which is adapted for interconnection to a container body 6 is shown which is designed to deform when the internal pressure of the container increases due to the activity of an unacceptable amount of bacterial contamination. Generally a container end closure 1 of one embodiment of the present invention includes at least a substantially spherical center section 2 interconnected to at least one reinforcing bead 3 that is interconnected to an end curl 5. The end closure further includes at least one deformable area 8 which is positioned adjacent to the reinforcing bead 3, and which is adapted to buckle at a predetermined internal pressure.

In one aspect of the present invention the apparatus is utilized in conjunction with food stored in a pressurized container. More specifically, in a canning facility, food is placed within the container body 6, which is sealingly interconnected to the end closure 1. Liquid nitrogen or another similar material is added to the container prior to sealing, which creates a gas sufficient to provide an internal pressure of between about 1–30 psi, and more typically an internal pressure of between about 10–30 psi.

The sealed container is then subject to heat at temperatures between about 250°–300° F., and more specifically about 252° F., which is the temperature generally considered necessary to kill any bacteria or other microorganism present within the food container. In one application, the heating or retort operation takes place in a steam "over-pressure" operation, wherein an external pressure of about 10–30 psi is applied to the exterior of the container to prevent excessive internal pressure and subsequent buckling or failure. Thus, if the internal container pressure is between about 20–25 psi, an over-pressure of about 20–25 psi would be utilized during retorting to assure that the container does not burst. This operation may be continuous in design, wherein water columns are utilized to maintain the steam chamber at a predetermined and substantially constant pressure, while significant volumes of sealed food containers pass through the steam bath.

Upon completion of the heating or retort operation, the internal pressure of the container is generally between about 1.0–30 psi, and more preferably about 23 psi. Any increase in pressure of at least about 0.5 psi and preferably about 2–5 psi will cause the deformable area 8 of the end closure to buckle, and thus provide a reliable indicator of spoilage.

Figure 3:
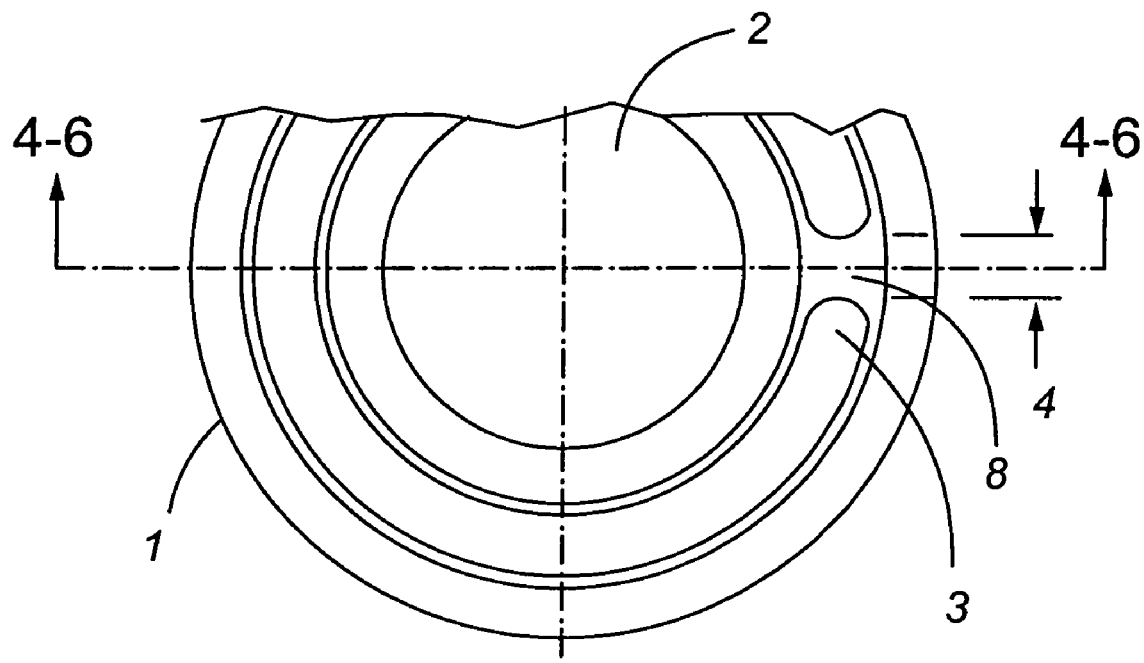
FIG. 3 is a partial top plan view of the embodiment shown in FIG. 1, but rotated 90 degrees.

Referring now to FIGS. 1 and 3, one embodiment of the present invention employing a deformable area 8 is shown herein. Preferably, the container end closure 1 includes a center panel with a center concave spherical section 2, an inner reinforcing bead 28, and an outer reinforcing bead 3. Since there is a general perception held by the consuming public that a bulged container indicates spoilage, a central panel 2 may be provided which indicates a condition of "no spoilage" or an internal vacuum. Further, the outer bead 3 is interrupted for a predetermined length 4, wherein an area of controlled buckle, or deformable area 8, is provided. In one embodiment this length is at least about 0.05 inches. One skilled in the art will appreciate that the deformable area 8 and bead interruption length 4 may be employed in a plurality of locations on the outer bead 3, in one or more locations on the inner bead 28, or a combination thereof and may include any variety of geometric configurations, i.e., circular, oval, square, triangular, etc. As further described herein, the term "indicator means" or "indicator area" or "deformable area" is defined as any unconformity in the container end closure 1 which is viewable by a consumer, and is not limited by any particular shape, size or other limiting factors.

Figure 2:
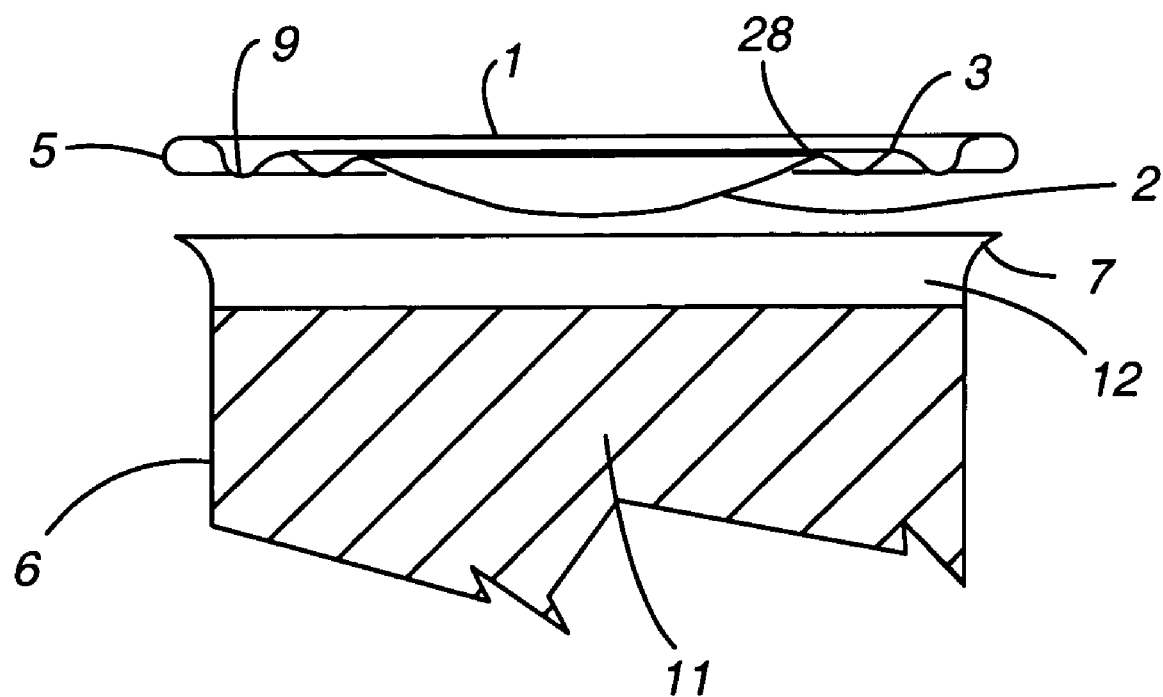
FIG. 2 is a partial cross sectional front elevation view of the embodiment shown in FIG. 1, and positioned immediately above an upper end of a container prior to interconnection.
Figure 4:
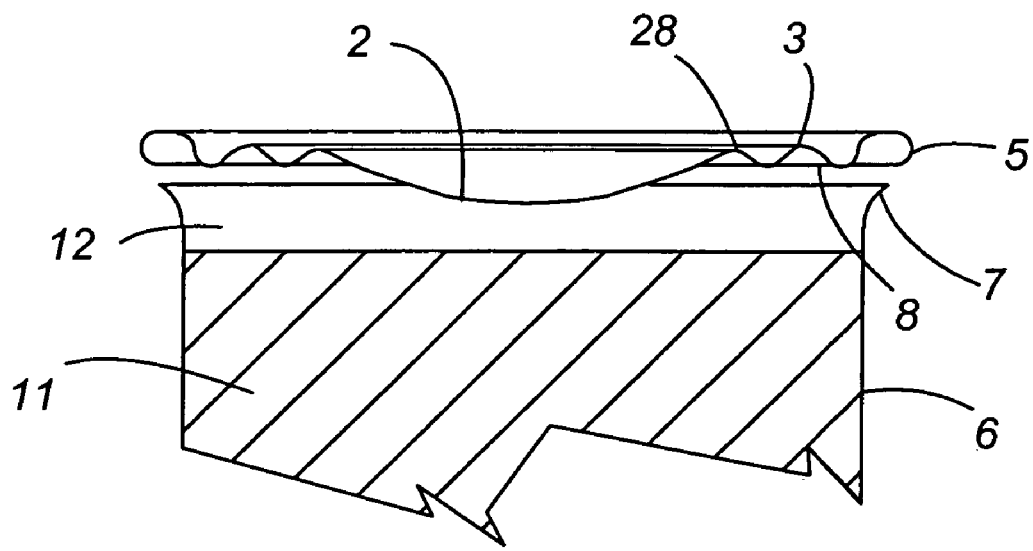
FIG. 4 is a partial front cross sectional view of the embodiment shown in FIG. 3.

Referring now to FIGS. 2 and 4, one embodiment of the present invention is provided wherein the end closure 1 is depicted prior to interconnection with a container body 6.

Generally, the container body 6 is filled with a food product 11 and double seamed to the container body. The sealing interconnection is achieved by deforming an end curl 5 employed on the can end 1 around a flange 7 employed on the neck of a container body 6, a process known as "double seaming" which is well known in the art. Preferably, an area of space 12 is provided to facilitate interconnection and to allow for expansion of the contents 11 during retort heating of the container.

Figure 5:
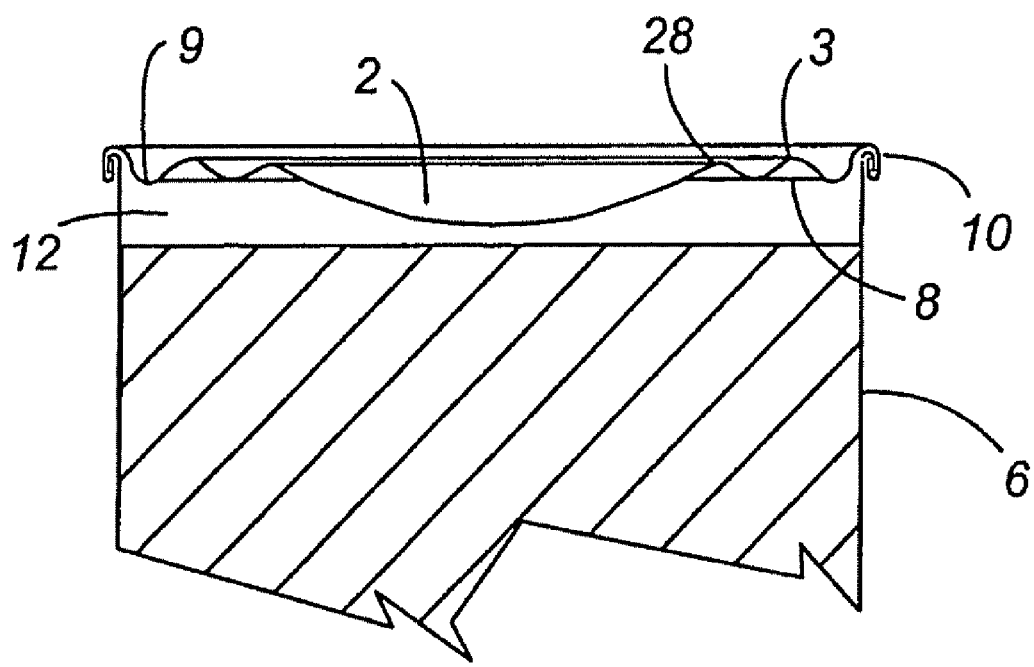
FIG. 5 is a partial front cross sectional view of the embodiment shown in FIG. 3, wherein the container end closure is double seamed and interconnected to a container.
Figure 6:
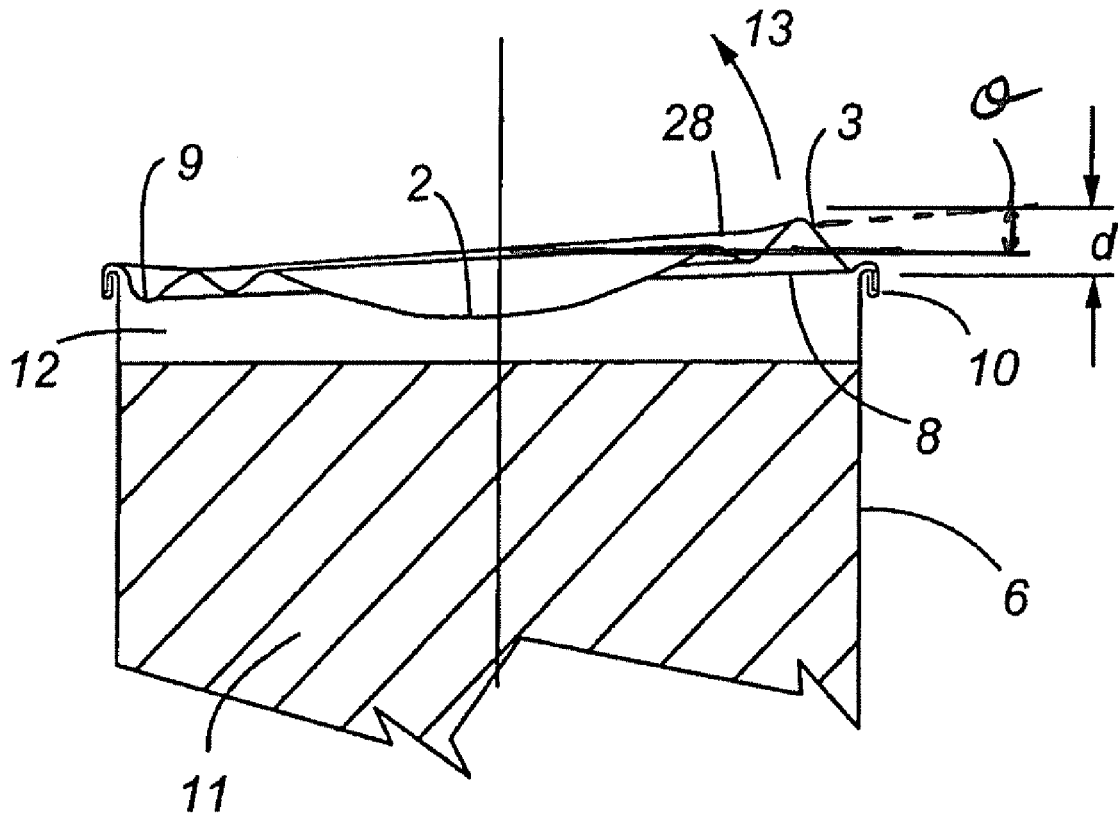
FIG. 6 is a partial front cross sectional view of the embodiment shown in FIG. 3, wherein the container end closure has been deformed by an increase in internal pressure.

Referring now to FIGS. 5 and 6, one embodiment of the present invention is provided wherein the can end closure is interconnected to the container body 6. When the internal pressure of the container reaches a predetermined level, which generally indicates the presence of an unacceptable level of bacterial activity, the axial stress imparted on the end closure 1 and the hoop stress imparted on the container body 6 are proportionately increased. By design, the deformable section 8 is the weakest point in the entire structure, and thus will buckle 13 before any other portion of the container body 6 or end closure 1 deforms. In addition, the deformed area 13 substantially prohibits the consumer's use of a can opener adapted to shear the end closure 1 along a countersink area 9 by blocking the shearing mechanism's path.

As further shown in FIG. 6, the container body generally has a longitudinal axis generally oriented in a vertical axis. When the deformable area 8 buckles, one portion of the end closure is pushed upwardly, wherein the end closure is deflected at an angle θ. Although the actual amount of deflection can vary significantly depending on the size of the container and materials used, it is estimated that the deformable area 8 may move upwardly a distance "d" between about 0.5–0.50 inches and create an angle θ of between about 2–25 degrees. Alternatively, the deformable area 8 may deform and move upwardly without the remainder of the end closure 1 deflecting, or the entire end closure may deflect without significant deformation of the deformable area 8.

Figure 7:
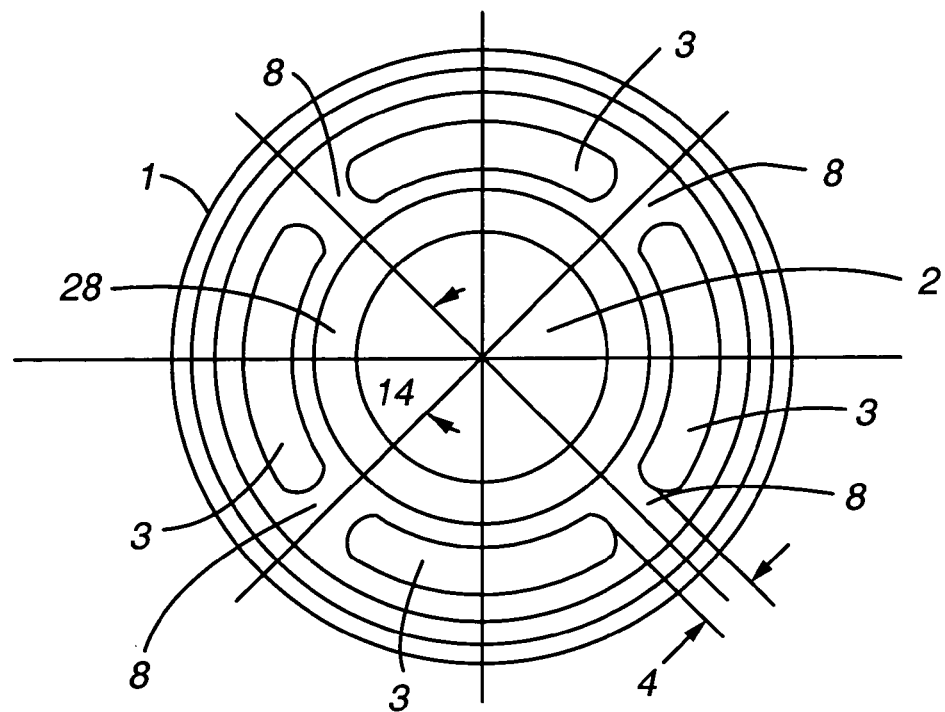
FIG. 7 is a top plan view of an alternate embodiment of the present invention, and which includes a plurality of deformable areas.

Referring now to FIG. 7, another embodiment of the present invention is provided which employs a plurality of deformable areas 8. As stated briefly above, one skilled in the art will appreciate that a plurality of deformable areas 8 can be integrated as reinforcing bead 3 interruptions 4. A container end closure 1 of this type may deform in one or many locations thereby further prohibiting access to the contents therein, and further indicating the presence of spoilage. The plurality of deformable areas 8 may be positioned at predetermined angles 14 from each other depending on the desired buckling effects. Hence, the more areas deformed will further impede opening of the container by providing additional obstacles. As shown herein, the deformable areas 8 are used in conjunction with the outer reinforcing bead 3, but similar results will be achieved if the deformable areas 8 are employed with the inner bead 28. Further, warning labels or other forces of indicia may be positioned on the deformable areas 8, or proximate thereto to provide sufficient warnings and instructions to consumers.

Figure 8:
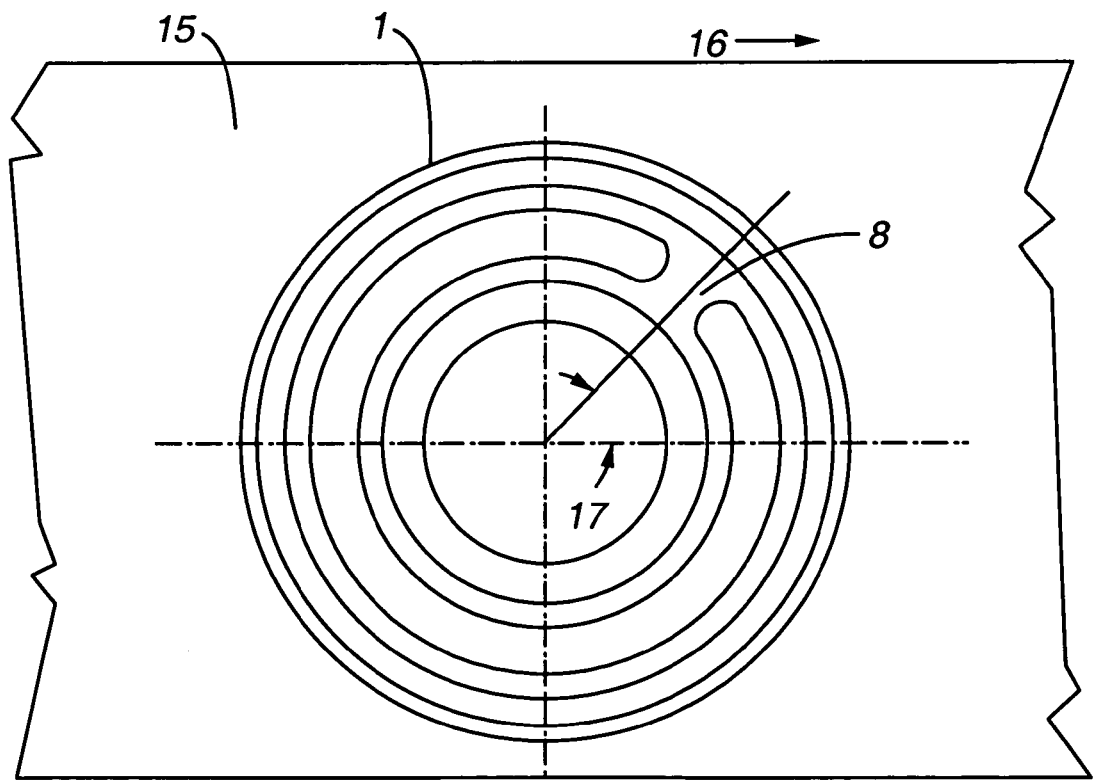
FIG. 8 is a top plan view of the embodiment shown in FIG. 1, subsequent to the pressing of a dye into sheet stock of a parent material.

Referring now to FIG. 8, an end closure 1 is shown prior to interconnection with a can body 6. Preferably, the end closure 1 of this embodiment is formed by a common stamping or roll-forming processes. For example, sheet stock 15 is fed into a press, wherein the roll direction 16 and the orientation of the end closure 1 is predetermined to facilitate future manufacturing steps. To achieve a consistent deformable area 8 thickness that coincides with a predetermined buckle pressure, it may be necessary to form the feature 8, or plurality thereof, on an angle 17 as shown. Next, the shape of the can end 1 is struck into the sheet stock 15 and the can end 1 is cut from the sheet stock 15 and further formed in preparation of final assembly.

Figure 9:
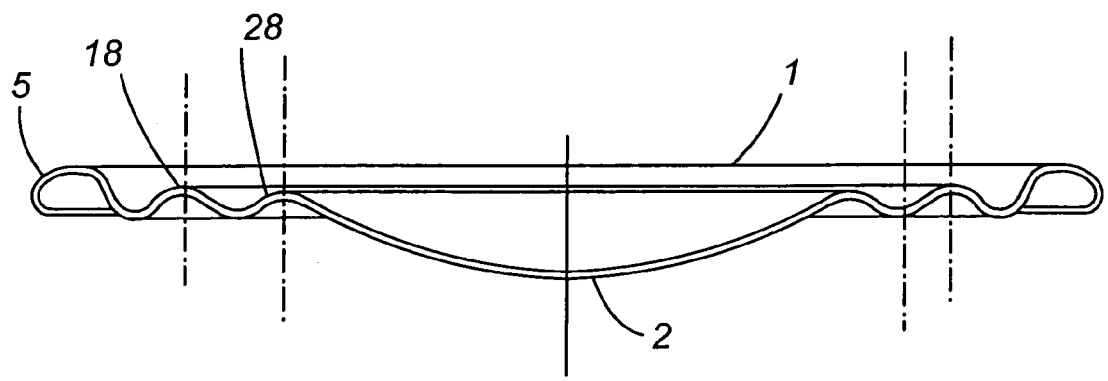
FIG. 9 is a front cross sectional view of an alternate embodiment of the present invention which includes two beads that protrude outwardly from the interior of the container.
Figure 10:
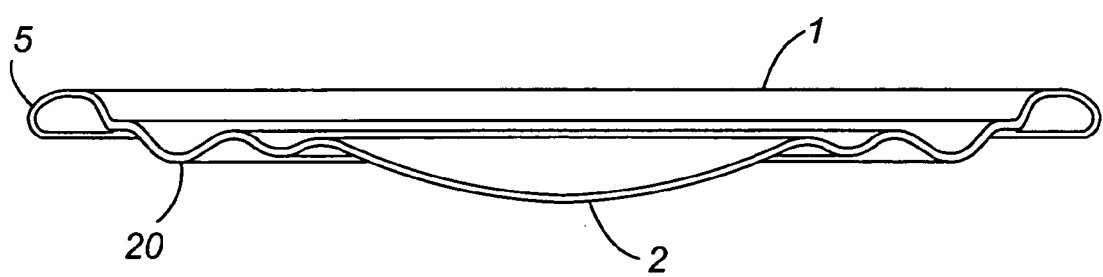
FIG. 10 is a cross sectional view of an alternate embodiment of the present invention employing two beads that protrudes towards the interior of the container.

Referring now to FIGS. 9 and 10, alternate reinforcing bead geometries are shown herein. For example, many end closures 1 employ convex beads 18 & 28 that protrude outwardly. Alternatively, some end closures 1 employ concave beads 19 & 20 that protrude in a direction toward the container body 6. This concave design is more adapted to effectively hold contents which are under pressure as opposed to a vacuum. Thus, it should be appreciated by one skilled in the art that the present invention may be applied to a variety of shapes and sizes of can ends that employ any number of reinforcing means, such as beads of any type, corrugations, multiple plies, etc.

Figure 11:
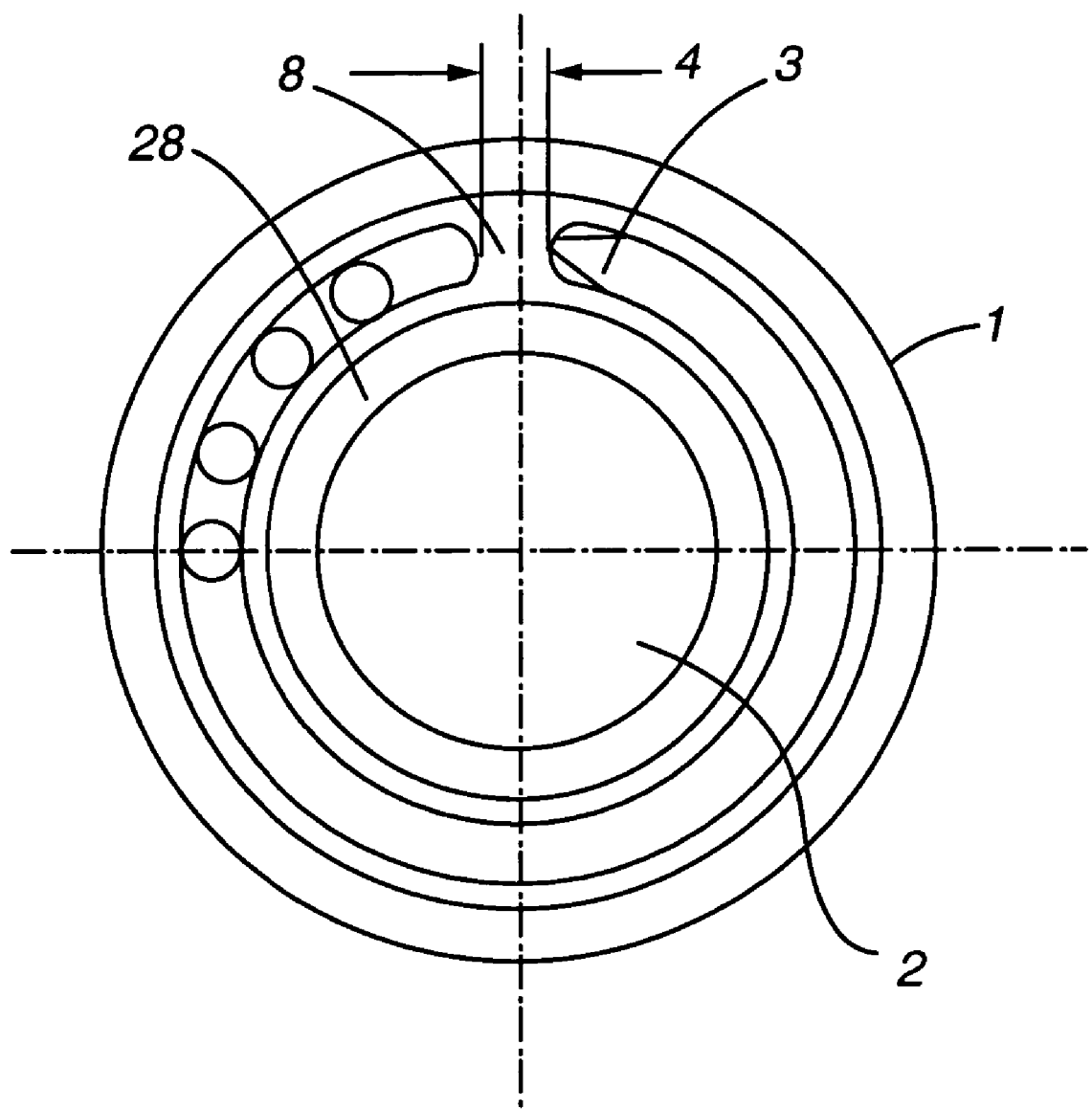
FIG. 11 is a top plan view of an alternative embodiment, wherein an alternate bead termination is employed.
Figure 12A:
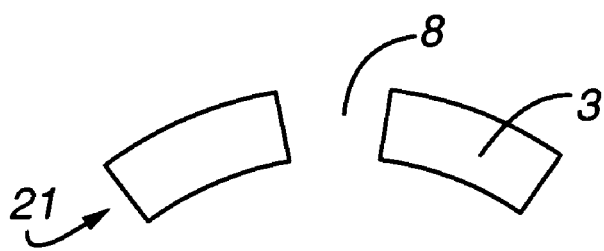
FIG. 12 are partial top plan views of a plurality of bead termination shapes with alternative geometries which could be employed to facilitate deformation in a localized area.
Figure 12B:
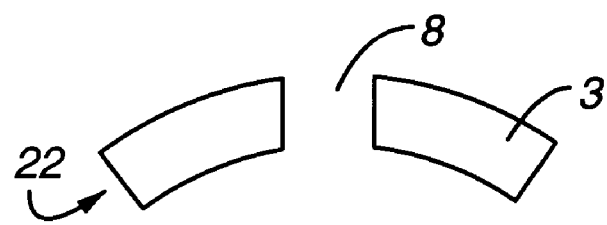
Figure 12C:
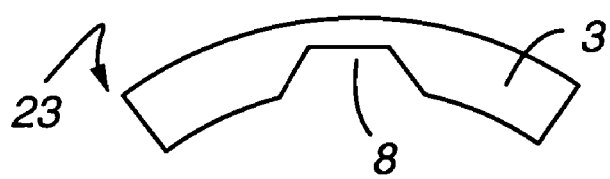
Figure 12D:
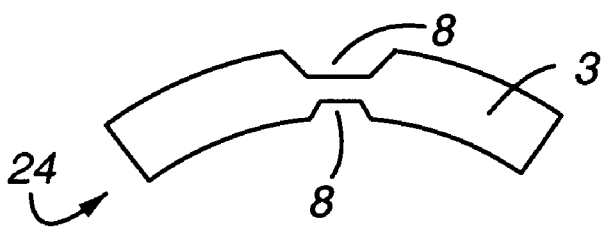
Figure 12E:
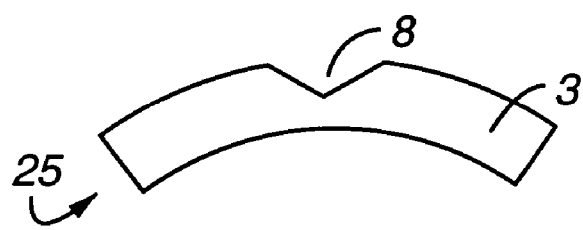
Figure 12F:
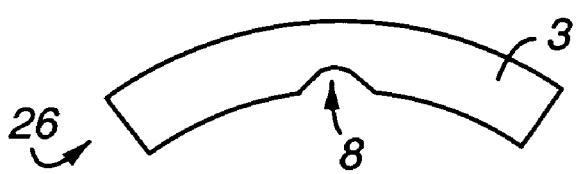
Figure 12G:
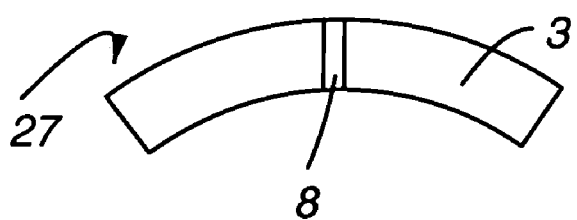

Referring now to FIGS. 11 and 12, alternate shapes of the deformable area 8 of the present invention are shown herein. Depending on the parent sheet material, which is typically aluminum, the desired buckle strength, manufacturing process, and many other factors understood by one skilled in the art, the reinforcing bead 3 of the end closure 1 may be interrupted 4 in a variety of ways to form a variety of deformable areas 21–27 as shown in FIG. 12. As shown in the figures, any number of shapes or sizes of deformable areas 8 may be employed to achieve the desired result as described and shown herein.

To assist in the understanding of the present invention the following list of components and associated numbering found in the drawings is provided herein:

| # | Component |
|---|---|
| 1 | Container end closure |
| 2 | Central panel |
| 3 | Outer reinforcing bead |
| 4 | Distance between bead interruptions |
| 5 | End curl |
| 6 | Container body |
| 8 | Deformable area |
| 9 | Countersink area |
| 10 | Double seam |
| 11 | Product |
| 12 | Head space |
| 13 | Direction of buckling |
| 14 | Angle between deformable areas |
| 15 | Sheet stock of parent material |
| 16 | Rolling direction |
| 17 | Angle of deformable area in relation to the rolling direction |
| 18 | Convex outer bead |
| 19 | Concave inner bead |
| 20 | Concave outer bead |
| 21 | Deformable area defined by angled ends |
| 22 | Deformable area defined by straight ends |
| 23 | Continuous bead with inner deformable area |
| 24 | Continuous bead with inner and outer deformable areas |
| 25 | Continuous bead with outer triangular deformable area |
| 26 | Continuous bead with inner triangular deformable area |
| 27 | Continuous bead with coined feature |
| 28 | Inner reinforcing bead |

The foregoing description of the present invention has been presented for purposes of illustration and description. Furthermore, the description is not intended to limit the invention to the form disclosed herein. Consequently, variations and modifications commenced here with the above teachings and the skill or knowledge of the relevant art are within the scope in the present invention. The embodiments described herein above are further extended to explain best modes known for practicing the invention and to enable others skilled in the art to utilize the invention in such, or other, embodiments or various modifications required by the particular applications or uses of present invention. It is intended that the dependent claims be construed to include all possible embodiments to the extent permitted by the prior art.

What is claimed is:

1. A metallic end closure adapted for sealing interconnection to a container for holding food in a pressurized state, comprising:
    a circular end wall;
    a central panel integrally interconnected to said circular end wall; and
    at least one indicator means positioned in said central panel proximate to said circular end wall, said indicator means having a pressure resistance less than said central panel, wherein when a pressure in the container increases to a predetermined level, said at least one indicator means employs a geometric shape which is distinct from said central panel, and wherein said indicator means is an interruption in a substantially continuous annular indentation in said central panel.

2. The end closure of claim 1, wherein said circular end wall is adapted for double seaming with a neck portion of a container body.

3. The end closure of claim 1, wherein said at least one indicator means deforms in shape when a pressure within the container increases at least about 1.0 psi.

4. The end closure of claim 3, wherein when said indicator means deforms, said end closure is tilted with respect to a vertical plane of said container at an angle of at least about 5 degrees.

5. The end closure of claim 1, wherein the container 5 stores food at a positive pressure of at least about 10 psi.

6. The end closure of claim 1, wherein said end closure is comprised of at least one of an aluminum, a tin and a steel material.

7. A method of detecting the presence of spoiled food contents within a container maintaining a positive pressure, comprising the steps of:
    providing a container with a metallic end closure which includes a defined indicator area adapted to deform at a predetermined pressure;
    deforming of said defined indicator area when a bacteria inside the closed container creates a gaseous byproduct that causes an internal pressure of said container to reach the predetermined level, wherein upon deformation said defined indicator area substantially prevents the operation of a container opening device that shears said central panel proximate to said circular end wall.

8. The method of claim 7, wherein said defined indicator area is positioned in a central panel of said end closure proximate to a circular end wall.

9. The method of claim 7, wherein upon said deforming step said metallic end closure becomes inclined with respect to a vertical axis of the container at least about 5 degrees.

10. The method of claim 7, wherein said defined indicator area deforms when the internal pressure increases at least about 1.0 psi.

11. The method of claim 7, wherein the container stores food at a positive pressure of at least about 10 psi.

12. A container end closure adapted for interconnection to a container for storing a food item under pressure, comprising:
    a peripheral end curl adapted for interconnection to a sidewall of a container body;
    a central panel integrally interconnected to said peripheral end curl and comprising a first portion with a first buckle resistance and a second portion positioned proximate to said peripheral curl having a second buckle resistance, wherein upon an increase of an internal pressure within the container of at least about 2 psi, said second portion deflects outwardly from said central panel to provide a visual indicator of spoilage within the container and wherein upon deformation said container end closure is substantially impeded from opening with a shear type container opening device.

13. The container end closure of claim 12, wherein said end closure is comprised of a metallic material.

14. The container end closure of claim 12, wherein said second portion deflects upwardly at least about 0.05 inches.

15. The container end closure of claim 12, wherein said peripheral end curl is double seamed to an upper end of a food container for sealing engagement.

16. The container end closure of claim 12, wherein said end closure is capable of retaining an internal pressure of at least about 10 psi prior to deformation.

* * * * *